United States Patent [19]

Simington

[11] Patent Number: 4,559,851
[45] Date of Patent: Dec. 24, 1985

[54] SAW CHAIN GRINDER

[76] Inventor: Jack F. Simington, Star Rte. Box 141, Chiloquin, Oreg. 97624

[21] Appl. No.: 564,481

[22] Filed: Dec. 21, 1983

[51] Int. Cl.$^4$ .............................................. B23D 63/16
[52] U.S. Cl. ........................................ 76/40; 76/25 A
[58] Field of Search ............................. 76/25 A, 40, 37

[56] References Cited

U.S. PATENT DOCUMENTS

| | | | |
|---|---|---|---|
| 2,811,873 | 11/1957 | Nielsen | 76/25 A |
| 2,824,468 | 2/1958 | Nielsen | 76/25 A |
| 3,013,448 | 12/1961 | Deck | 76/25 A |
| 3,071,026 | 1/1963 | DeWitt | 76/25 A |
| 3,717,051 | 2/1973 | Silvey | 76/25 A |
| 3,779,103 | 12/1973 | Silvey | 76/25 A |
| 4,299,142 | 11/1981 | Kaye | 76/25 A |
| 4,336,726 | 6/1982 | Silvey | 76/25 A |

*Primary Examiner*—Roscoe V. Parker
*Attorney, Agent, or Firm*—Harvey B. Jacobson

[57] ABSTRACT

A generally horizontal elongated mount is provided having structure on one end for supportive anchoring from one marginal edge portion of a workbench with the other end portion of the mount projecting outwardly of the bench marginal edge portion. A depending support leg is carried by the mount spaced intermediate the opposite ends thereof and the lower end of the leg is adjustably extendible for supportive engagement from a floor surface. A support shaft generally parallels the mount and is supported therefrom for adjustable angular displacement relative thereto about the longitudinal axis of the shaft and the end of the shaft corresponding to the one end of the mount oscillatably supports one end of a swing arm therefrom for angular displacement relative to the shaft about an axis transverse to the swing arm and the shaft and angularly adjustable with the shaft. The free end of the swing arm journals a motor driven grinding wheel therefrom for rotation about an axis transverse to the swing arm and the other end of the mount is disposed beneath the free end of the swing arm and supports an elongated grooved saw chain support structure therefrom for adjustable angular positioning about a vertical axis shiftable laterally of the mount. Further, structure is provided whereby the free end of the swing arm is biased laterally to take up slack in the pivot connection between the swing arm and the shaft as the swing arm other end is swung toward the saw chain support structure.

13 Claims, 9 Drawing Figures

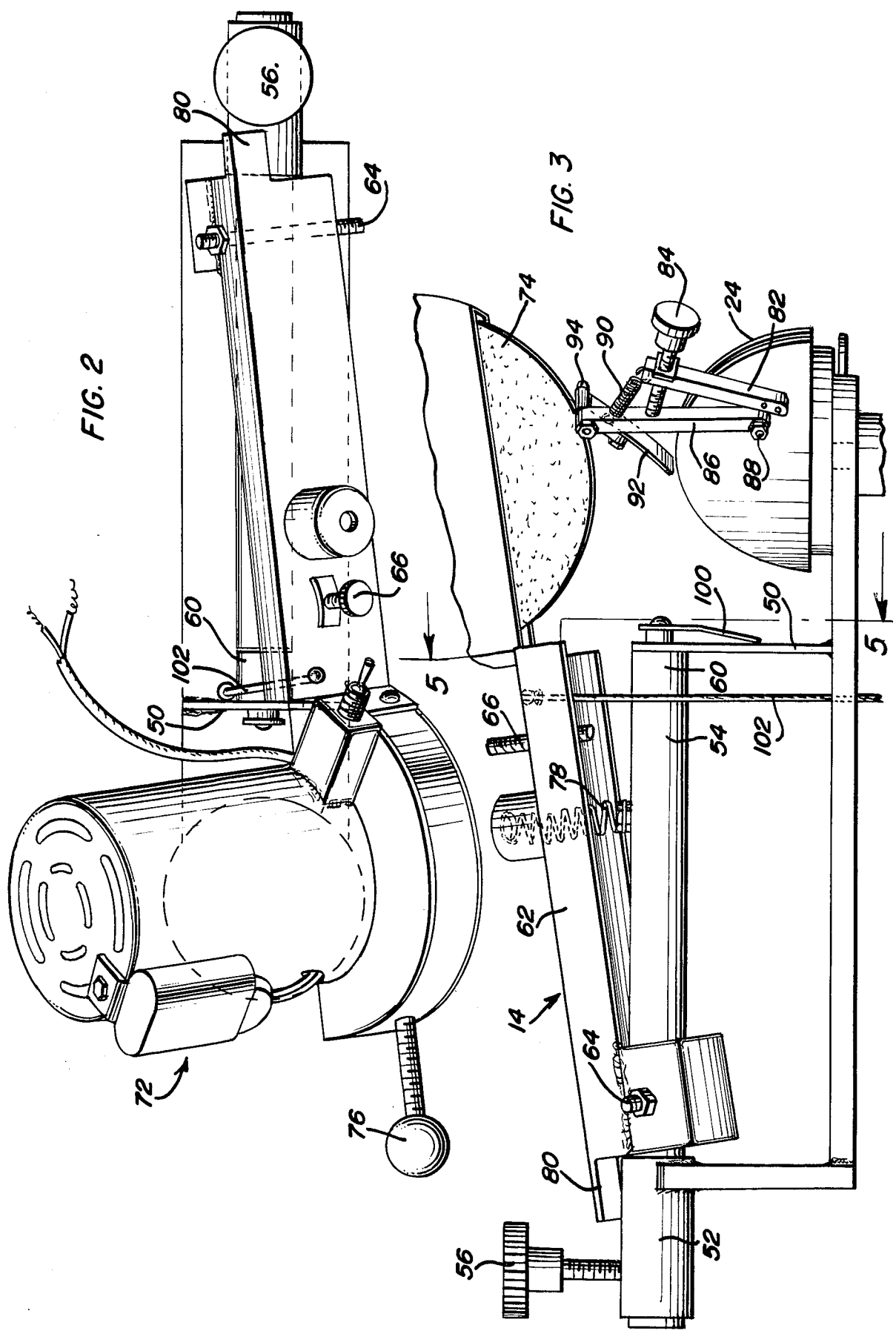

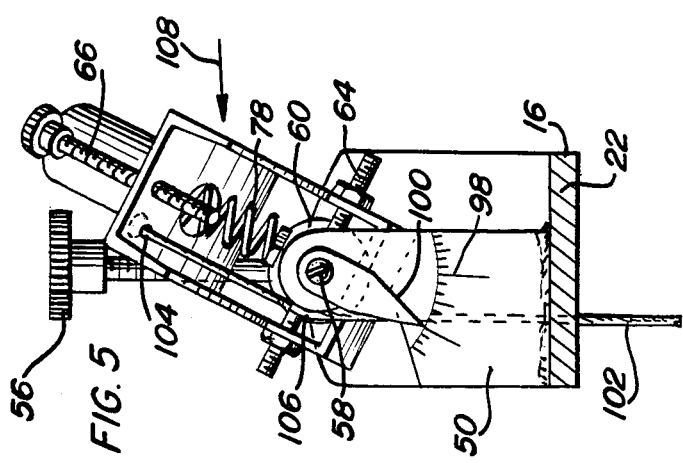
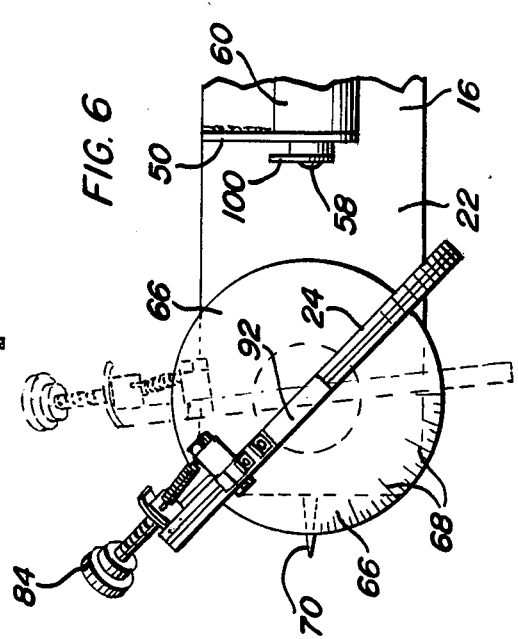
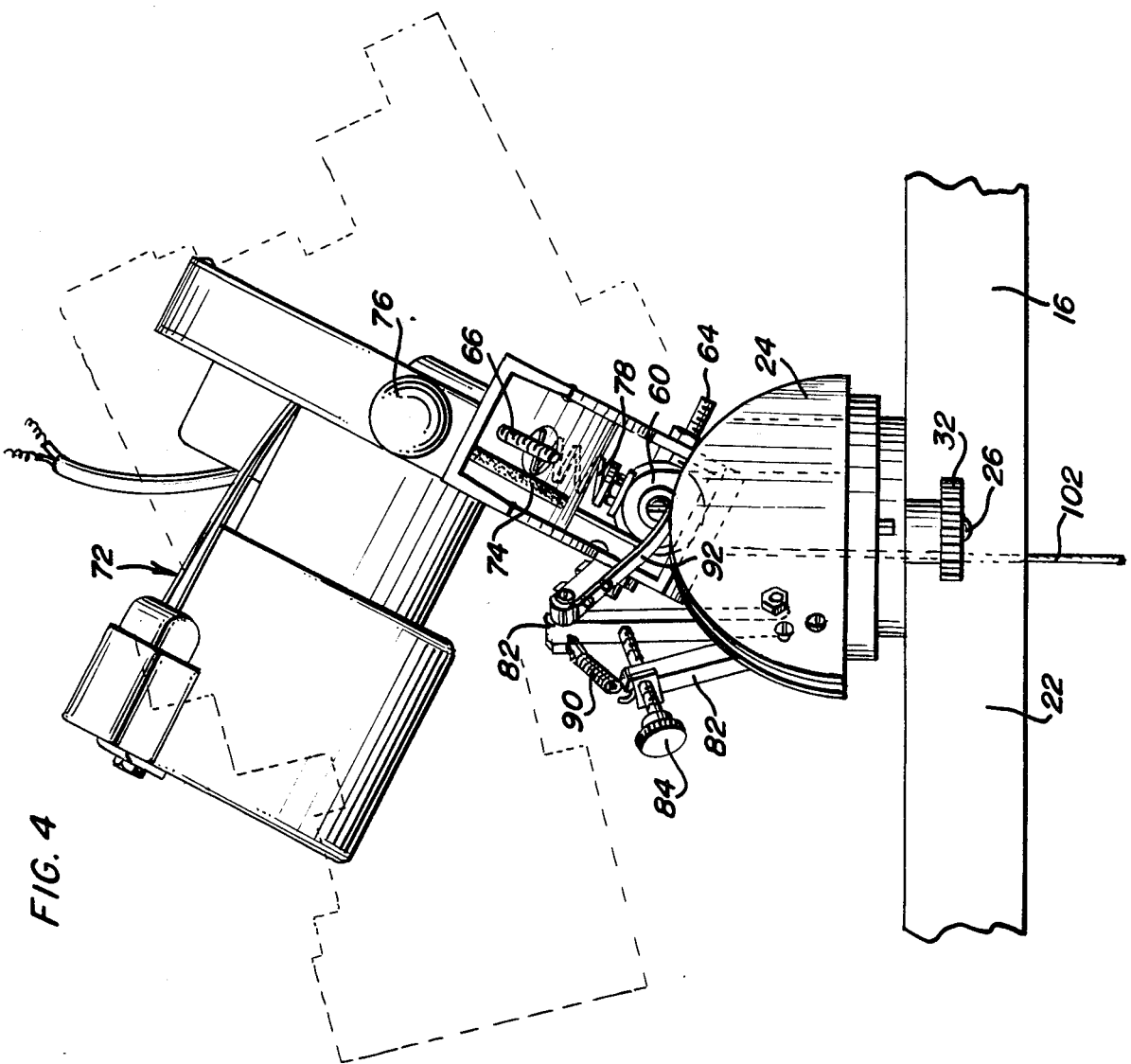

SAW CHAIN GRINDER

BACKGROUND OF THE INVENTION

When sharpening a saw chain, in addition to filing or grinding the depth gauges and rounding the latter, the teeth of the chain are ground. However, according to the type of teeth used on the chain, the teeth must be ground such that the top plate filing angle, top plate cutting angle and side plate filing angle are reasonably precise within predetermined limits. While various guides heretofore have been provided to facilitate hand sharpening of chain saw teeth the majority of recent development in chain saw sharpening has been in the area of supporting a power driven rotary grinding wheel and a saw chain tooth to be sharpened in proper relationship whereby the chain tooth may be properly sharpened by the wheel. It is also important to provide an apparatus whereby successive teeth on each side of a chain may be substantially identically sharpened and that the teeth on opposite sides of the chain be substantially identically sharpened.

To this end many motor driven grinding wheel equipped saw chain sharpeners heretofore have been provided such as those disclosed in U.S. Pat. Nos. 2,811,873, 3,013,448, 3,071,026, 3,717,051, 3,779,103, 4,299,142 and 4,336,726. These motor driven rotary grinding wheel equipped sharpeners provide various structures whereby successive teeth to be sharpened may be disposed in position for relative movement toward and away from the periphery of the associated rotary grinding wheel.

However, many of these previously known sharpeners include extensive structure for mounting a rotary grinding wheel and chain tooth to be sharpened for movement relative to each other and wherein such extensive structure incorporates various types of connections between relatively movable components inherently including clearances which ultimately result in a non-precise guiding movement between the rotary grinding wheel and the saw tooth to be sharpened as the tooth and rotary grinding wheel move into and out of engagement with each other. This non-precise guided movement often results in variations in the sharpening of teeth not only on one side of a chain but also differences in the manner in which teeth on opposite sides of the chain are sharpened.

Therefore, an need exists for a saw chain sharpener incorporating a rotary grinding wheel and including structure whereby precise relative movement between the rotary grinding wheel and a tooth to be sharpened may be obtained.

In addition, a further need exists for a chain sharpener including structure whereby the sharpener may be readily adjusted to sharpen the teeth of either a round chain or a chisel chain.

The main object of this invention is to provide a chain saw sharpener which is capable of providing precise relative movement between a rotary grinding wheel and a chain tooth to be sharpened.

Another object of this invention is to provide a sharpener in accordance with the preceding object and constructed in a manner whereby it may be quickly adapted for sharpening the teeth of either a round chain or a chisel chain.

Still another important object of this invention is to provide a sharpener which may be either bench mounted or stand mounted.

A further object of this invention is to provide a chain saw sharpener which will be capable of allowing lateral movement of the associated grinding wheel thereof away from the tooth surface being ground upon initial radial displacement of the grinding wheel from the tooth being ground.

A final object of this invention to be specifically enumerated herein is to provide a chain saw tooth grinder in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged top plan view of the assemblage illustrated in FIG. 1;

FIG. 3 is a fragmentary enlarged elevational view of the grinder as seen from the rear of FIG. 1;

FIG. 4 is a fragmentary enlarged front elevational view of the grinder;

FIG. 5 is a fragmentary vertical sectional view taken substantially upon the plane indicated by the section line 5—5 of FIG. 3;

FIG. 6 is a fragmentary elevational view taken substantially upon the plane indicated by the section line 6—6 of FIG. 1;

DETAILED DESCRIPTION OF THE INVENTION

Figure 1:
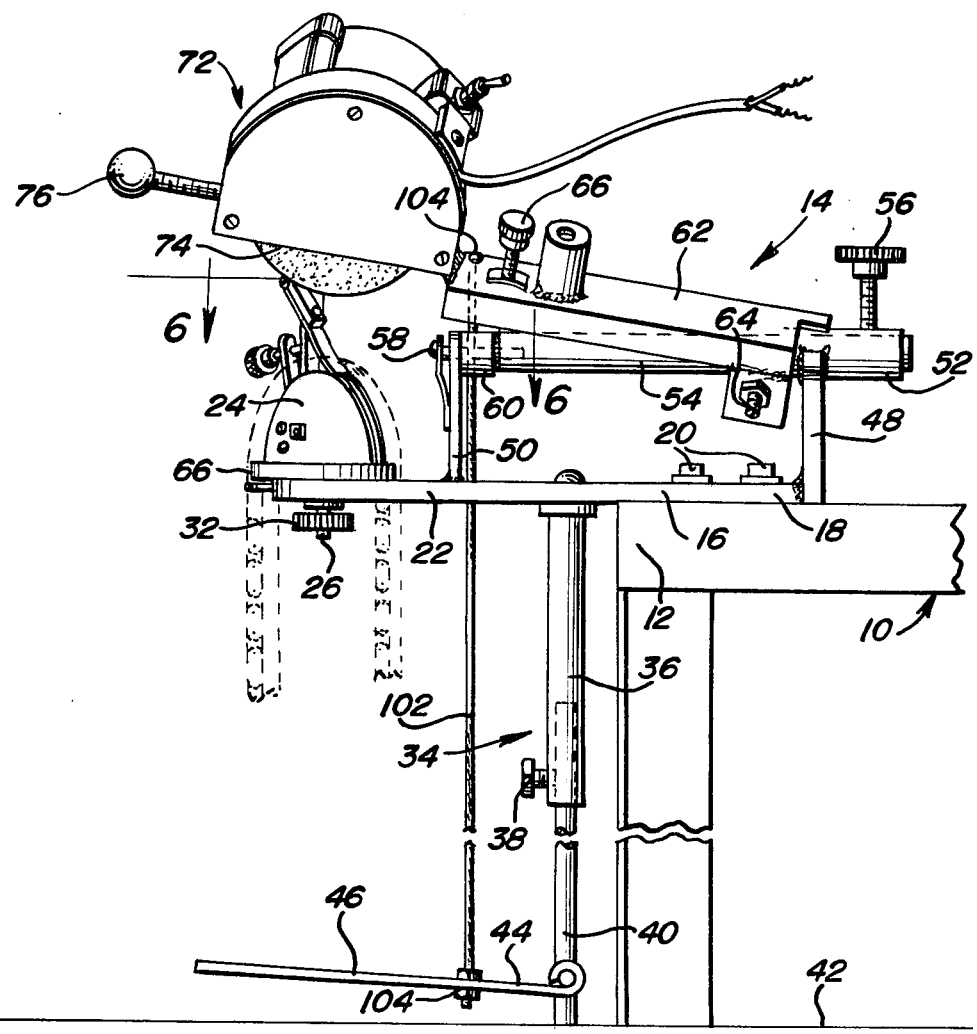
FIG. 1 is a side elevational view of the saw chain grinder of the instant invention in a form thereof to be bench mounted and floor braced.
Figure 7:
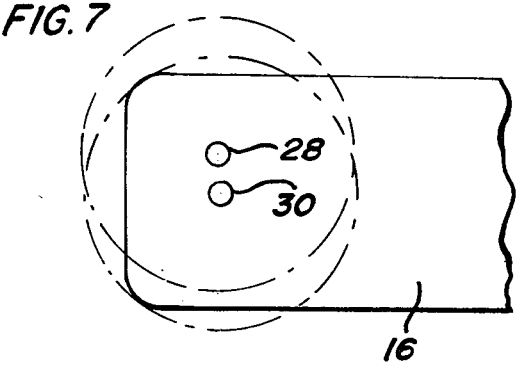
FIG. 7 is a fragmentary top plan view illustrating a first form of chain holder support mount end portion.

Referring now more specifically to the drawings the numeral 10 generally designates a workbench including a first marginal portion 12. The saw chain grinder of the instant invention is referred to in general by the reference numeral 14 and includes a horizontally elongated base or mounting member 16 having one end 18 thereof secured to the bench 10 through the utilization of suitable fasteners 20. The second end 22 of the base 16 projects endwise outwardly from the marginal portion 12 and includes a centrally grooved, upwardly convex and semi-circular saw chain support 24 supported therefrom through the utilization of a depending threaded shank 26 secured downwardly through and rotatably in one of a pair of vertical bores 28 and 30 formed in the base 16 by a clamp screw 32. The intermediate portion of the elongated base 16 projecting outwardly from the marginal portion 12 includes a depending leg assembly referred to in general by the reference numeral 34 and the leg assembly 34 includes a first downwardly opening upper tubular end portion 36 equipped with a lower end setscrew 38 and a lower rod-like end portion 40 upwardly telescoped into the upper end portion 36 and secured in position therein by the setscrew 38. The lower end portion 40 downwardly abuts the floor 42 from which the bench 10 is supported and oscillatably supports one end 44 of a foot operated lever 46 therefrom for swinging in a vertical plane containing the elongated base 16. Of course, the length of the leg assembly 34 may be adjusted relative to the height of the bench 10. Further, the leg assembly 34 may include, on its lower end, splayed legs whereby the entire saw chain grinder 14 may be supported from the leg assembly 34 independent of the bench 10. If the lower end portion 40 of the leg assemly 34 is to be provided with splayed legs, the lever 46 may be pivoted from one of those legs.

The base 16 includes a pair of longitudinally spaced upstanding plates 48 and 50 and the upper end of the plate 48 supports a horizontal sleeve 52 extending longitudinally of the base 16. One end of a support shaft 54 is journalled in the sleeve 52 and the latter includes a setscrew 56 for retaining the shaft 54 in adjusted angularly displaced position. the end of the shaft 54 remote from the sleeve 52 has an endwise outwardly projecting small diameter pivot shaft 58 supported therefrom and rotatably received through the plate 50. The shaft 58 includes a Nylon roller 60 journalled thereon between the plate 50 and the adjacent end of the shaft 52 and one end of an elongated swing arm 62 is oscillatably supported from the end of the shaft 54 adjacent the plate 48 through the utilization of a pivot shaft 64 passed transversely through the swing arm 62 and also transversely through the shaft 54. Accordingly, when the shaft 54 is angularly displaced relative to the sleeve 52, the transverse pivot shaft 64 is also angularly displaced.

The swing arm 62 generally parallels the shaft 54 and the end of the swing arm 62 remote from the pivot shaft 64 may be swung toward and away from the center axis of the shaft 54. The free end of the swing arm 62 includes an abutment screw 66 supported therefrom engageable with the shaft 54 to limit swinging movement of the free end of the arm 62 toward the center axis of the shaft 54.

Figure 8:
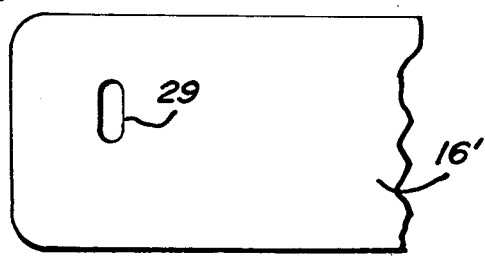
FIG. 8 is a fragmentary top plan view of a second form of chain holder support mount end portion.

In a modified form of the invention illustrated in FIG. 8 a base 16' is provided and is identical to the base 16, except that a transverse slot 29 is provided therein in lieu of the pair of vertical bores 28 and 30 formed in the base 16. The bores 28 and 30 allow the saw chain support to be mounted either on center by the bore 30 or off-center by the bore 28 and the slot 29 allows the same on-center or off-center mounting of the saw chain support 24. Of course, the saw chain support 24 is angularly displaceable about the center axis of the shank 26 and the support 24 includes a protractor plate portion 66 having degree indicia 68 thereon registrable with a pointer 70 carried by the adjacent end of the base 16.

The free swinging end of the swing arm 62 rigidly supports a motor driven grinding wheel assembly referred to in general by the reference numeral 70 therefrom and the grinding wheel assembly 72 includes a rotary grinding wheel 74 journalled for rotation about an axis disposed transverse to the free end of the swing arm 62. The assembly 72 includes a handle 76 and a compression spring 78, see FIG. 3, is operably connected between the shaft 54 and the free end of the swing arm 62 and yieldingly biases the free end of the swing arm 62 away from the corresponding end of the shaft 54. Further, it will be noted from FIG. 3 of the drawings that the pivoted end of the swing arm 62 includes an extended lug portion 80 engageable with the sleeve 52 for limiting swinging movement of the free end of the support arm 62 away from the shaft 54.

Figure 9:
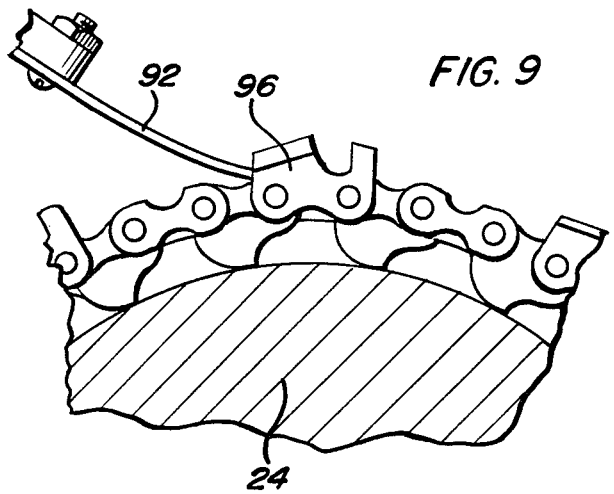
FIG. 9 is a fragmentary enlarged vertical sectional view of the upper portion of the chain holder illustrating the manner in which a length of chain may be supported therefrom and a chain tooth positioning finger included on the grinder may be used to properly position a chain tooth to be sharpened.

With attention now invited more specifically to FIG. 3 of the drawings, it amy be seen that the saw chain support 24 includes an upstanding mounting arm 82 supported therefrom and that the upper end of the mounting arm is equipped with a friction braked abutment screw 84. In addition, an upstanding locator arm 86 is pivotally supported from the saw chain support 24 as at 88 and an expansion spring 90 is connected between the upper ends of the arms 82 and 86 and yieldingly biases the upper end of the arm 86 toward the upper end of the mounting arm 82. Movement of the upper end of the arm 86 toward the upper end of the arm 82 is limited by the adjustable abutment screw 84. The upper end of the locator arm 86 pivotally supports an elongated locator leaf spring 92 therefrom as at 94 and the locator spring 92 is engageable with a saw chain tooth 96, see FIG. 9, supported from the saw chain support 24 in order to properly position the tooth 96 relative to the support 24 whereby movement of the grinding wheel 74 toward the tooth 96 upon downward swinging of the forward free end of the swing arm 72 will cause proper engagement of the grinding wheel 74 with the tooth 96 in order to sharpen the latter and simultaneously provide the desired top plate filing angle, top plate cutting angle and side plate filing angle.

The plate 50 includes protractor scale indicia 98 thereon and the pivot shaft 58 includes a pointer 100 supported therefrom registrable with the protractor scale indicia 98.

An elongated cable or other suitable tension member 102 has one end secured to the free forward end of the swing arm 62 as at 104 and the other end of the cable 102 is anchored to the lever 46 as at 104. Accordingly, downward movement of the free end of the lever 46 will cause the free end of the swing arm 62 to move toward the longitudinal center axis of the shaft 54. However, the upper end portion of the cable 102 is deflected as at 106 over the roller 60 and thus laterally deflects the free end of the swing arm 62 in the direction of the arrow 108 in FIG. 5. Such deflection is limited by operating clearances between the swing arm 62 and the base 16 and thus all operating clearances are compensated for as downward pressure on the lever 46 against the biasing action of the spring 78 causes the free forward end of the swing arm 62 to swing downwardly and the lower periphery of the grinding wheel 74 to be brought into engagement with the tooth 96. In this manner, all operating clearances (slop) are taken up by the lateral deflection of the cable 102 about the roller 60. Further, when downward movement of the swing arm 62 has been limited by engagement of the abutment screw 64 with the shaft 54, initial release of downward pressure on the lever 46 enables lateral swinging of the support arm 62 in a direction to swing the grinding wheel 74 laterally out of engagement with the tooth 96 as initial upward movement of the swing arm 62 is realized. This prevents the rotary grinding wheel 74 from grinding away the feathered edge on the tooth 96 as downward pressure upon the forward free swinging end of the swing arm 62 is released.

Inasmuch as the axis of rotation of the grinding wheel 74 is disposed substantially in the same vertical plane as the shank 26, teeth on opposite sides of a chain may be substantially identically sharpened as well as teeth on the same side of the chain. Further, selective use of the bores 28 and 30 as well as opposite end portions of the slot 29 enable the teeth of round chains as well as the teeth of chisel chains to be sharpened.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A chain sharpener including a generally horizontal elongated mounting member, mounting means on one end portion of said member for supportive mounting from a suitable support such as a bench or table with said mounting member projecting outwardly from one marginal portion of said bench, a depending leg carried by said mounting member and spaced there along from said one end portion toward the opposite end and including a lower end portion for supportive engagement with a lower support surface from which said bench is supported, a chain support structure supported from said opposite end, a tool head mounted from said mounting member for guided movement toward and away from said chain support structure, an elongated foot operable lever having one end pivotally attached to said lower end portion for swinging in a generally vertical plane paralleling said mounting member and with the other end of said lever facing in generally the same horizontal direction in which said opposite end of said mounting member faces, motion transmitting means operatively connected between said lever and head operative to displace said head toward said chain support structure responsive to downward displacement of said other end of said foot lever.

2. The chain support structure of claim 1 wherein said leg includes structure for adjustable extension and retraction of said lower end portion relative to the upper end portion of said leg.

3. The chain sharpener of claim 1 wherein said head is mounted on one end of a swing arm, mounting means mounting the other end of said swing arm from said one end portion of said mounting member for angular displacement of said swing arm about a first axis transverse to said swing arm and angular displacement of said first axis about a second axis paralleling said mounting member.

4. The chain sharpener of claim 3 including bias means yieldingly biasing said swing arm toward a position with said head displaced away from said chain support structure, said motion transmitting means, during downward movement of said lever to displace said head toward said chain support structure against the biasing action of said bias means includes means operative to laterally deflect said one end of said arm in one direction along said first axis to thereby take up slack in the pivot connection between said swing arm and said mounting member.

5. The chain sharpener of claim 3 including means mounting said chain support structure from said opposite end of said mounting member for adjustable angular displacement about an upstanding third axis generally normal to said second axis.

6. The chain sharpener of claim 5 wherein said means mounting said chain support structure from said opposite end of said mounting member includes means operative to adjustably laterally shift said third axis relative to said second axis.

7. A chain sharpener including a mounting member for stationary support from a suitable support surface, an elongated swing arm, a tool head including a rotary grinding wheel mounted on one end of said swing arm, means mounting the other end of said swing arm from one end of said mounting member for limited angular displacement of said swing arm relative thereto about a first axis transverse to said swing arm and mounting member and also angular displacement of said first axis about a second axis stationary relative to said mounting member and generally paralleling said swing arm, chain support structure supported from the other end of said mounting member toward and away from which said rotary grinding wheel is movable upon angular displacement of said swing arm relative to said mounting member about said first axis, and manually operable actuating means connected between said mounting member and swing arm for swinging said one end of said swing arm toward and away from said second axis, said actuating means including means operative to laterally deflect said one end of said swing arm in one direction along said first axis during movement of said one end of said swing arm toward said second axis to thereby take up slack in the pivot connection between said swing arm arm and mounting member defined by said first axis.

8. A chain sharpener including a generally horizontally elongated mounting member for stationary support from a suitable support surface, an elongated swing arm, a tool head including a rotary grinding wheel mounted on one end of said swing arm, means mounting the other end of said swing arm from one end of said mounting member for angular displacement of said swing arm relative thereto about a first axis transverse to said swing arm and mounting member and also angular displacement of said first axis about a second axis generally paralleling said mounting member, chain support structure supported from the other end of said mounting member toward and away from which said rotary grinding wheel is movable upon angular displacement of said swing arm relative to said mounting member about said first axis, bias means yieldingly biasing said swing arm toward a position with said head displaced away from said chain support structure, manually operable actuating means connected between said mounting member and said swing arm for swinging said swing arm against the biasing action of said bias means toward a position with said head adjacent said chain support structure, said actuating means including means operative to laterally deflect said one end of said arm in one direction along said first axis during movement of said head toward said support structure to thereby take up slack in the pivot connection between said swing arm and mounting member defined by said first axis.

9. The chain support structure of claim 8 including means mounting said chain support structure from said other end of said mounting member for adjustable angular displacement about an upstanding third axis generally normal to said second axis.

10. A chain sharpener including a generally horizontally elongated mounting member for stationary support from a suitable support surface, an elongated swing arm, a tool head including a rotary grinding wheel mounted on one end of said swing arm, means mounting the other end of said swing arm from one end of said mounting member for angular displacement of said swing arm relative thereto about a first axis transverse to said swing arm and mounting member and also angular displacement of said first axis about a second axis generally paralleling said mounting member, chain support structure supported from the other end of said mounting member toward and away from which said rotary grinding wheel is movable upon angular displacement of said swing arm relative to said mounting member about said first axis, means mounting said chain support structure from said other end of said mounting member for adjustable displacement about an upstanding third axis generally normal to said second axis, said means mounting said chain support structure from said other end of said mounting member including means operative to adjustable laterally shift said third axis relative to said second axis.

11. A chain sharpener including an elongated mounting member for stationary support from a suitable support structure, an elongated shaft generally paralleling said mounting member, means mounting one end of said shaft from one end of said mounting member for adjustable angular displacement of said shaft about its longitudinal axis, chain support structure mounted from the other end of said mounting member, an elongated swing arm, a tool head including a rotary grinding wheel mounted from one end of said swing arm, means mounting the other end of said swing arm from said one end of said shaft for angular displacement of said swing arm relative to said shaft about an axis transverse to said swing arm and said shaft, means yieldingly biasing said swing arm toward a position with said tool head displaced away from the longitudinal center axis of said shaft, manually operable actuating means operatively connected between said mounting member and said swing arm for angularly displacing said swing arm relative to said shaft toward a position with said tool head positioned closely adjacent said chain support structure, said manually operable actuating means including means to laterally deflect said one end of said swing arm in one direction along the axis of oscillation of said swing arm relative to said shaft during actuation of said actuating means to swing said tool head toward said chain support structure to thereby take up slack in the pivot connection defined between said swing arm and said shaft.

12. The chain sharpener of claim 11 including means mounting said chain support structure from said other end of said mounting member for adjustable angular displacement about an upstanding axis generally normal to said shaft.

13. The chain support structure of claim 12 wherein said means mounting said chain support structure from said other end of said mounting member includes means operative to adjustably laterally shift said upstanding axis relative to said shaft.

* * * * *